Figure 1:
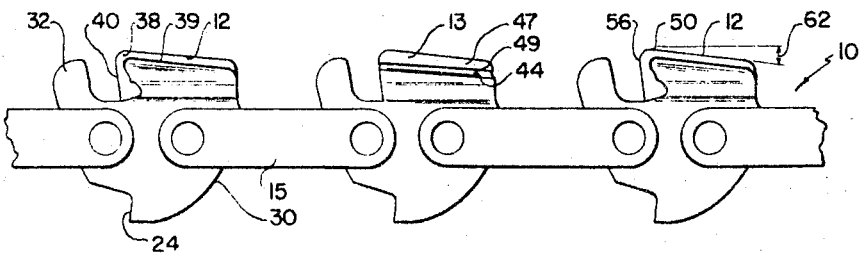

Aug. 30, 1966  M. F. COOPER  3,269,434

SAW CHAIN CUTTER TOOTH

Filed June 29, 1964

INVENTOR
MAURICE F. COOPER
BY
Fetherstonhaugh & Co.
ATTORNEYS

United States Patent Office 3,269,434
Patented August 30, 1966

3,269,434
SAW CHAIN CUTTER TOOTH
Maurice Fitzgerald Cooper, 645 Smith Road,
New Westminster, British Columbia, Canada
Filed June 29, 1964, Ser. No. 378,633
Claims priority, application Canada, July 20, 1963,
880,586, Patent 700,203
11 Claims. (Cl. 143—135)

This invention relates to improved cutter teeth for saw chains.

An object of the present invention is the provision of a cutter tooth for chain saws designed to permit air to flow over the surface thereof near the side portion of the tooth that cuts into the wood in order to prevent the tooth from becoming too hot.

Another object is the provision of a saw chain cutter tooth having a rib arrangement along the cutting side thereof which keeps most of the tooth away from the wood along the side of the kerf being cut in order to reduce friction and thereby reduce heat and power loss.

Another object is the provision of a cutter tooth with a rib along the cutting side thereof which produces a clear cut line that acts as a gauge when the tooth is being sharpened with a file.

With most chain saw cutter teeth on the market, comparatively large areas of the sides thereof scrape along the walls of the kerfs in which the teeth are operating. The resulting friction causes the teeth to get very hot, resulting in weakening of the metal and rapid dulling of the cutting edges. This friction cannot be eliminated altogether, but the present cutter tooth has a rib along the cutting side thereof which presents a comparatively narrow outer surface to the wood along the side of the kerf, this area being a minimum relative to the cutting edge of the tooth which is necessary to cut into the wood to form the side wall of the kerf. Furthermore, this rib arrangement forms a longitudinal air passage along the side of the tooth adjacent the surface thereof rubbing along the kerf wall. This allows for the circulation of air over the surface of the tooth near the side cutting edge and along the portion of the tooth rubbing over the kerf wall. In addition to this, the rib forms a clear cut line extending longitudinally of the tooth which provides a gauge which enables a person to see how far down the shank of the tooth side cutting edge may extend without fear of unduly weakening the tooth structure.

A saw chain cutter tooth according to the present invention comprises a flat body adapted to fit into and form part of a saw chain, a shank integral with the body and inclined generally outwardly and laterally to one side therefrom, a toe portion integrally connected to an outer edge of said shank and extending transversely across the plane of the body and terminating in an edge extending generally longitudinally of the body on the side of the latter remote from the shank, a rib formed at a juncture of the toe portion and the shank and extending longitudinally of the body, said rib in cross section projecting laterally from the shank farther than any other portion of the tooth to form a longitudinal air passage beneath the rib and extending along side the shank, an undercut transverse cutting edge formed on a forward edge of the toe portion with reference to the direction of movement of the tooth during use and extending across the plane of the body, and a side cutting edge along a forward edge of said rib extending generally towards the body and extending from said transverse cutting edge approximately to said shank, said forward edge of the rib being undercut inwardly of the rib at said side cutting edge.

Figure 2:
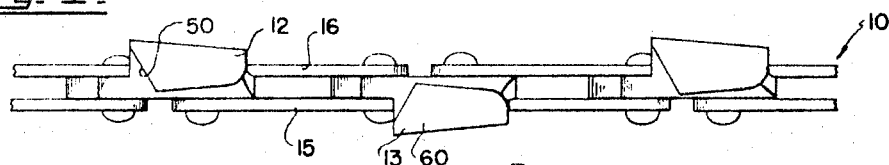
Figure 4:
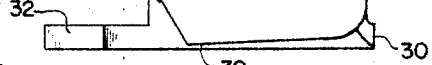
Figure 3:
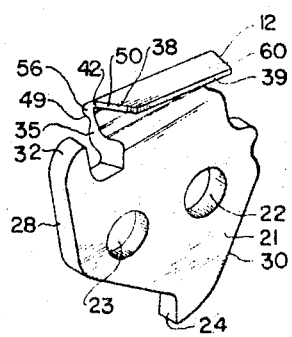
Figures 5, 6:
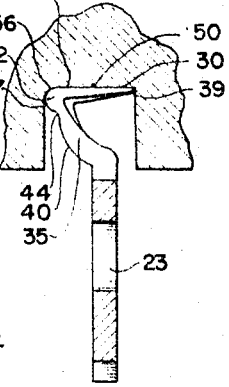
Figures 7, 8:
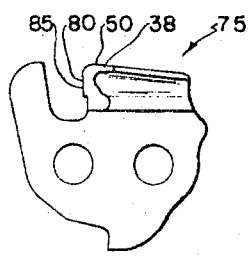
Figure 9:
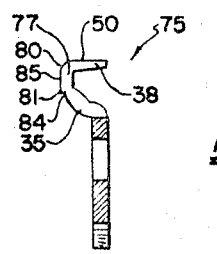

Two examples of this invention are illustrated in the accompanying drawings, in which:

FIGURE 1 is a side elevation of a portion of a saw chain incorporating a preferred form of cutter tooth, FIGURE 2 is a plan view of the chain, FIGURE 3 is an enlarged perspective view of the cutter tooth shown in FIGURES 1 and 2, FIGURE 4 is an enlarged plan view of this tooth, FIGURE 5 is a vertical section taken on the line 5—5 of FIGURE 4, showing the tooth in a kerf, FIGURE 6 is a rear elevation of this tooth, FIGURE 7 is a side elevation of an alternative form of cutter tooth, FIGURE 8 is a plan view of the tooth of FIGURE 7, and FIGURE 9 is a vertical section taken on the line 9—9 of FIGURE 8.

Referring to FIGURES 1 and 2 of the drawings, 10 is a saw chain incorporating a plurality of improved right-hand and left-hand cutter teeth 12 and 13, respectively, which are interconnected in the chain by pairs of standard side links 15 and 16. As this invention is primarily concerned with the cutter teeth, the actual arrangement or construction of the saw chain is not of importance. Teeth 12 and 13 are identical, excepting that one is a right-hand and the other a left-hand cutter, and therefore only one, tooth 12, will now be described in detail.

Cutter tooth 12 is clearly shown in FIGURES 3 to 6. Cutter 12 includes a flat body 21 having holes 22 and 23 therethrough adjacent its ends and through which rivets extend hingedly to connect side links of the saw chain to the body. A driving lug 24 projects from an edge of the body, said lug, when the tooth forms part of a saw chain, being engaged by the driving sprocket of a chain saw, not shown. Body 21 has a forward edge 28 and a rearward edge 30. A depth gauge 31 projects outwardly from body 21 adjacent edge 28 thereof.

A shank 35 is integrally formed with body 21 and is inclined generally outwardly and laterally to one side thereof, see FIGURE 5. A toe portion 38 is integrally connected to an outer edge of shank 35 and extends transversely across the plane of body 21 and terminates in an edge 39 extending generally longitudinally of the tooth on the side of body 21 remote from shank 35, see FIGURES 4 and 5. A rib 42 is formed at the juncture of toe portion 38 and shank 35 and extends longitudinally of the tooth body, said rib in cross section projecting laterally from shank 35 farther than any other portion of tooth 12 to form a longitudinal air passage 44 beneath said rib and extending along side shank 35. Rib 42 is very thin in cross section, as clearly shown in FIGURE 5, and is formed with a curved outer surface 47 throughout the length thereof. This surface 47 curves sharply into shank 35 to form a clear line 49 extending longitudinally of the tooth at the junction of the rib and shank, see FIGURE 1.

An undercut transverse cutting edge 50 is formed on the forward edge of toe portion 38 with reference to the direction of movement of the tooth during use, which is indicated by arrow 53 in FIGURE 4. It will be noted that cutting edge 50 extends across the plane of body 21, and said cutting edge is preferably angled rearwardly from rib 42 across the plane of the body. A side cutting edge 56 is formed along the forward edge of rib 42 and extends generally towards body 21 and extends from transverse cutting edge 50 approximately to the upper edge of shank 35. Side cutting edge 56 is undercut inwardly of rib 42 in the same way as transverse cutting edge 50 is undercut.

Toe portion 38 is formed with a substantially flat outer surface 60 which inclines inwardly a little from transverse cutting edge 50 towards the tooth body, as indicated by angle 62 in FIGURE 1. The outer surface 47 of rib 42 is inclined inwardly from side cutting edge 56 a little towards the plane of body 12, as indicated by angle 65 in FIGURE 4. It will also be noted that edge 39 of toe portion 38 is inclined inwardly from transverse cutting edge 50 towards the plane of body 21.

When chain 10 is drawn through the wood, transverse cutting edge 50 cuts across the wood to form the bottom of a kerf, said kerf being indicated at 68 in FIGURE 5. Side cutting edge 56 cuts into the wood to form a side wall of the kerf in the usual manner. As the outer surface 47 of rib 42 is very small and curved, only a small area of tooth 12 rubs along the wall of the kerf, thereby keeping friction down to a minimum. Passage 44 which extends along rib 42 and along the outer surface of shank 35 allows air to travel along the kerf very close to the side cutting edge 56 thereby keeping the metal of the whole tooth cooler than would otherwise be the case. The greatest friction seems to be in the area of side cutting edge 56 and along the portion of the tooth scraping along the side wall of the kerf and, therefore, this air passage 44 keeps the metal of the tooth comparatively cool where it is most needed. This prevents a great deal of heat from travelling to other parts of the tooth.

Line 49 can be clearly seen since it extends along the juncture of rib 42 and shank 35. This line is located at a level where it is not necessary to sharpen the leading edge of shank 35. Thus, when a person is filing transverse edge 50 and side edge 56 with a cylindrical file, he can see by line 49 where he should stop filing in the direction extending from the toe portion 38 to shank 35. There is no indication on standard cutter teeth so that a great many people file too far along the tooth shank thereby weakening the metal in the shank where it is subjected to the greatest strain during operation. This neglect results in the breakage of many cutter teeth.

FIGURES 7 to 9 illustrate an alternative form of cutter tooth 75. This tooth is the same as tooth 12, excepting that it is formed with a larger rib 77 at the juncture of shank 35 and toe portion 38. Rib 77 is formed with a flat outer surface 80 throughout the length thereof which curves sharply in at 81 to form an edge of the rib at shank 35. For general purposes, tooth 75 is not considered as good as tooth 12 since the air passage 84 of the former is farther away from the juncture of transverse cutting edge 50 and the side cutting edge 85 at the forward end of rib 77 than air passage 44 is from the juncture of the transverse cutting edge 50 and side cutting edge 40 of tooth 12. However, for some purposes, tooth 75 is very useful, and particularly in stringy wood, such as spruce.

What I claim as my invention is:

1. A saw chain cutter tooth comprising a flat body adapted to fit into and form part of a saw chain, a shank integral with the body and inclined generally outwardly and laterally to one side therefrom, a toe portion integrally connected to an outer edge of said shank and extending transversely across the plane of the body and terminating in an edge extending generally longitudinally of the body on the side of the latter remote from the shank, a rib formed at a juncture of the toe portion and the shank and extending longitudinally of the body, said rib in cross section projecting laterally from the shank farther than any other portion of the tooth to form a longitudinal air passage beneath the rib and extending along side the shank, said rib being thin in vertical cross section and having an edge facing towards the body and which extends abruptly inwardly towards said shank, an undercut transverse cutting edge formed on a forward edge of the toe portion with reference to the direction of movement of the tooth during use and extending across the plane of the body, and a side cutting edge along a forward edge of said rib extending generally towards the body and extending from said transverse cutting edge approximately to said shank, said forward edge of the rib being undercut inwardly of the rib at said side cutting edge.

2. A saw chain cutter as claimed in claim 1 in which the rib is formed with a curved outer surface throughout the length thereof and curving sharply in to the shank to form a clear line extending longitudinally of the tooth at the junction of the rib and shank.

3. A saw chain cutter as claimed in claim 1 in which the rib has a flat outer surface throughout the length thereof which curves sharply in to form an edge of the rib at the shank.

4. A saw chain cutter as claimed in claim 1 in which the transverse cutting edge is angled rearwardly from the rib across the plane of the body.

5. A saw chain cutter as claimed in claim 1 in which the toe portion is formed with a substantially flat outer surface inclined inwardly a little from the transverse cutting edge towards the body.

6. A saw chain cutter as claimed in claim 1 in which the outer surface of the rib is inclined inwardly from the side cutting edge a little towards the plane of the body.

7. A saw chain cutter as claimed in claim 1 in which the toe portion is formed with a substantially flat outer surface inclined inwardly a little from the transverse cutting edge towards the body, said toe portion being formed with side edges that are inclined inwardly from the transverse cutting edge towards the plane of the body.

8. A saw chain cutter as claimed in claim 3 in which the transverse cutting edge is angled rearwardly from the rib across the plane of the body.

9. A saw chain cutter as claimed in claim 3 in which the toe portion is formed with a substantially flat outer surface inclined inwardly a little from the transverse cutting edge towards the body.

10. A saw chain cutter as claimed in claim 3 in which the outer surface of the rib is inclined inwardly from the side cutting edge a little towards the plane of the body.

11. A saw chain cutter as claimed in claim 3 in which the toe portion is formed with a substantially flat outer surface inclined inwardly a little from the transverse cutting edge towards the body, said toe portion being formed with side edges that are inclined inwardly from the transverse cutting edge towards the plane of the body.

No references cited.

DONALD R. SCHRAN, *Primary Examiner.*